United States Patent
Goela et al.

(10) Patent No.: US 8,716,824 B2
(45) Date of Patent: May 6, 2014

(54) ARTICLE HAVING ELECTRICALLY CONDUCTIVE AND SELECTIVELY PASSIVATED PATTERNS

(75) Inventors: Jitendra S. Goela, Andover, MA (US); Michael A. Pickering, Dracut, MA (US); Neil D. Brown, Merrick, NY (US); Angelo Chirafisi, Howard Beach, NY (US); Mark Lefebvre, Hudson, NH (US); Jamie L. Triba, Nashua, NH (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 502 days.

(21) Appl. No.: 12/322,030

(22) Filed: Jan. 28, 2009

(65) Prior Publication Data
US 2010/0170707 A1    Jul. 8, 2010

Related U.S. Application Data

(63) Continuation of application No. 10/982,949, filed on Nov. 6, 2004, now abandoned.

(60) Provisional application No. 60/517,932, filed on Nov. 6, 2003.

(51) Int. Cl.
*H01L 31/0203* (2014.01)

(52) U.S. Cl.
USPC ............ 257/434; 257/431; 257/433; 257/436

(58) Field of Classification Search
USPC .................................................. 257/431–437
See application file for complete search history.

(56) References Cited

U.S. PATENT DOCUMENTS

| | | | |
|---|---|---|---|
| 4,770,479 A | 9/1988 | Tustison | |
| 4,772,080 A | 9/1988 | Tustison | |
| 4,978,577 A | 12/1990 | Purohit et al. | |
| 5,099,105 A | 3/1992 | Goerenz et al. | |
| 5,183,689 A | 2/1993 | Taylor et al. | |
| 5,225,933 A | 7/1993 | Myers et al. | |
| 5,336,378 A | 8/1994 | Nishimura et al. | |
| 5,384,571 A | 1/1995 | Myers et al. | |
| 5,453,233 A | 9/1995 | Tverovsky et al. | |
| 5,458,754 A | 10/1995 | Sathrum et al. | |
| 5,476,549 A | 12/1995 | Taylor et al. | |
| 5,488,371 A | 1/1996 | Targove | |
| 5,686,195 A | 11/1997 | Taylor et al. | |
| 5,738,708 A | 4/1998 | Peachey et al. | |
| 5,757,058 A * | 5/1998 | Song .............................. | 257/449 |
| 5,808,241 A | 9/1998 | Brooks | |
| 6,083,561 A | 7/2000 | Goela et al. | |
| 6,143,072 A | 11/2000 | McKee et al. | |
| 6,177,711 B1 * | 1/2001 | Kariya ........................ | 257/458 |
| 6,214,090 B1 | 4/2001 | Dye et al. | |
| 6,221,482 B1 | 4/2001 | Goela | |
| 6,264,336 B1 * | 7/2001 | Epstein et al. ................ | 359/606 |
| 6,287,710 B1 | 9/2001 | McKee et al. | |

(Continued)

FOREIGN PATENT DOCUMENTS

| | | |
|---|---|---|
| DE | 221 206 | 4/1985 |
| EP | 1 267 318 | 12/2002 |
| GB | 2 381 179 | 4/2003 |
| JP | 57210994 | 12/1982 |

*Primary Examiner* — Ori Nadav
(74) *Attorney, Agent, or Firm* — John J. Piskorski

(57) ABSTRACT

An optical article and method of making the same are provided. The optical article has optical multi-aperture operation. The optical article has one or more electrically conductive and selectively passivated patterns.

6 Claims, 3 Drawing Sheets

(56) References Cited

U.S. PATENT DOCUMENTS

| | | |
|---|---|---|
| 6,428,896 B1 | 8/2002 | Ramsey et al. |
| 6,458,414 B1 | 10/2002 | Habeger et al. |
| 6,469,685 B1 | 10/2002 | Woodruff et al. |
| 6,472,636 B1 | 10/2002 | Baldwim |
| 6,548,912 B1 | 4/2003 | Graff et al. |
| 6,784,463 B2 * | 8/2004 | Camras et al. ............ 257/99 |
| 7,119,372 B2 * | 10/2006 | Stokes et al. ............ 257/79 |
| 7,199,911 B2 * | 4/2007 | Hudson et al. ............ 359/2 |

* cited by examiner

ARTICLE HAVING ELECTRICALLY CONDUCTIVE AND SELECTIVELY PASSIVATED PATTERNS

The present application is a non-provisional application of U.S. provisional application Ser. No. 60/517,932, filed Nov. 6, 2003.

BACKGROUND OF THE INVENTION

The present invention is directed to an optical article with optical multi-aperture operation. More specifically, the present invention is directed to an optical article with optical multi-aperture operation having electrically conductive and selectively passivated patterns.

Optical articles, which may transmit various forms of radiation, are in demand in various industries. Examples of industries where optical articles are used include the electronics, nautical and aeronautics industries. Optical articles include windows, domes, and lenses, which are used to protect electronic devices on terrestrial, nautical and aeronautical vessels from undesired electromagnetic interference as well as other forms of radiation that may interfere with the optimum performance of such devices.

A process known as chemical vapor deposition (CVD) is often used to fabricate optical articles. The CVD process includes the steps of directing reactant gases into a reactor vessel disposed at elevated temperatures and chemically reacting the gases to form the material. The material is deposited over a substrate to provide the particular optical article. The CVD process is a continuous process in which new reactant gases are introduced into the vessel and by-product gases and un-deposited material vapors are vented. The combination of the reactants and by-product gases as well as the elevated temperature provides a highly corrosive environment.

Many optical articles have either layers or gratings buried within the articles. Such layers or gratings may be used for heating to de-ice the optical article, provide electromagnetic shielding, or provide electromagnetic absorption. Such layers also may be used to provide a surface reflective to one or more wavelength bands of incident electromagnetic energy. Optical articles such as bandpass filters and dichroic beam splitters, which require a pair of surfaces reflectively responsive to different electromagnetic wavelengths, may be fabricated having one or more buried reflective layers.

When the optical article is fabricated by providing a chemical vapor deposited material over a reflective or conductive surface, the high temperatures and the chemically corrosive environment often degrade the surface morphology of the highly reflective or conductive materials. Further, when layers of the highly reflective metals such as gold or silver are used, the high temperatures and corrosive environment of the CVD process causes the layers to agglomerate. When first deposited, these metals tend to have a mirror-like, smooth and hence a reflective surface. However, during CVD, small islands of the material are formed leaving behind holes previously occupied by the material. Additionally, for some materials such as silver, total removal of the layer often occurs. This degradation in the surface morphology leads to reduced conductivity and reflectivity of the buried layers. Typically, high conductivity and reflectivity are the most important properties of these buried layers. Accordingly, buried layers containing highly reflective and conductive materials are not readily found within optical articles fabricated from chemically vapor deposited materials.

U.S. Pat. No. 4,772,080 discloses optical elements with buried layers prepared using CVD methods. The elements are composed of a base layer, an intermediate layer over the base layer, which is composed of a refractory material and an overcoat of a CVD deposited material. The base and the overcoat layer of CVD material may be silicon, germanium, group materials, aluminum oxynitride, zinc sulfide, zinc selenide, yttrium oxide and magnesium oxide. The intermediate layer may be tungsten, molybdenum, tantalum, titanium, and rhodium, or dielectrics such as borides, carbides, nitrides, oxides or silicides.

The patent also discloses that the elements have a base, a passivating layer of refractory material over the base, a conducting layer over the passivating layer and a second passivating layer of refractory material over the conducting layer. A CVD deposited material forms a coat over the conducting layer. The pair of passivating layers may be composed of refractory type metals or refractory dielectrics. The conductive layer may be composed of a refractory type of metal such as tungsten, or a metal such as copper, silver, gold, platinum, palladium or aluminum. The patent states that the passivating layers protect and isolate the conductive layers from elevated temperatures and corrosive chemicals during CVD processes when coating the article with the overcoat layer.

A disadvantage of the optical elements disclosed in the patent is that the passivating layers completely encompass the intermediate region with the electrically conductive refractory metals. These passivating layers completely isolate the electrically conductive refractory metals from both the base layer and the overcoat layer. Because the materials that compose the passivating layers are different from the materials that compose both the base and overcoat layers, refractive indices of radiation transmitted to and from the optical elements change at the interface of the passivating layers and the base and overcoat layers. The change in the index of refraction of the radiation compromises the accuracy and over all performance of the optical elements. Radiation is reflected at the refractive index change boundary, thus reducing the overall transmission of the optic. In addition, radiation is bent as it passes through the passivation layer, due to the different refractive index, causing image distortion.

Another problem associated with the intermediate region of the optical elements is the bond interface between the passivating layers and both the base and overcoat layers. Since the materials, which compose the passivating layers and the base and overcoat layers are different, a weak bond is formed between the passivating layer and the overcoat and base layers. This weak bond may result in the separation of the passivating layers from both the overcoat and base layers compromising operation of the optical elements or completely disrupting their operation.

Accordingly, there is a need for improved optical articles and methods of making the same, which have an improved design and transmission.

SUMMARY OF THE INVENTION

An article including one or more electrically conductive and selectively passivated patterns, each pattern is joined to and is between layers of material having a capability of multiple wavelength band radiation transmission.

In another embodiment the article includes one or more electrically conductive and selectively passivated patterns, each pattern includes one or more metal or metal alloy layers, and each pattern is joined to and is between layers of material having a capability of multiple wavelength band radiation transmission.

In a further embodiment the article includes one or more electrically conductive and selectively passivated patterns, each pattern includes one or more metal or metal alloy layers, each pattern is joined directly to one layer of material having a capability of multiple wavelength band radiation transmission, and joined to a second layer of the material having a capability of multiple wavelength band radiation transmission by a bonding layer.

In an additional embodiment a method includes providing a material having a capability of multiple wavelength band radiation transmission on a substrate to form a first layer; depositing an electrically conductive and selectively passivated pattern on the layer; and depositing a second layer of the material having a capability of multiple wavelength band radiation transmission over the electrically conductive and selectively passivated pattern to form an article having optical multi-aperture operation.

Another method includes depositing a material having a capability of multiple wavelength band radiation transmission on a substrate to form a first layer; selectively depositing one or more metal or metal alloy layers on the first layer; selectively depositing a passivating layer on the one or more metal or metal alloy layers to form an electrically conductive and selectively passivated pattern; and depositing another layer of the material having a capability of multiple wavelength band radiation transmission on the electrically conductive and selectively passivated pattern to form an article having multi-aperture operation.

A further method includes depositing a material having a capability of multiple wavelength band radiation transmission on a substrate to form a first layer; selectively depositing a bonding material on the first layer; selectively depositing one or more metal or metal alloy layers on the bonding material; selectively depositing one or more passivating layers of metal or metal alloy to form an electrically conductive and selectively passivated pattern; and depositing a second layer of the material having a capability of multiple wavelength band radiation transmission over the electrically conductive and selectively passivated pattern opposite the first layer to form an article having multi-aperture operation.

The optical articles may include one electrically conductive and selectively passivated pattern for optical multi-aperture operation, or may include two or more electrically conductive and selectively passivated patterns. When the optical article has two or more patterns, each pattern is separated from an adjacent pattern by a layer of material having a capability of multiple wavelength band radiation transmission.

Selective passivation protects the electrically conductive metal and metal alloy layers from the harsh conditions when applying the material to encase the metal and metal alloys in the article. Additionally, selective passivation of the electrically conductive pattern eliminates or at least reduces alteration of the index of refraction of radiation transmission. Accordingly, the optical articles have improved radiation transmission over the radiation transmission of many conventional articles with passivated electrically conductive regions.

Selective passivation of the electrically conductive patterns also permits direct bonding of the material which encases the electrically conductive and selectively passivated patterns of the article. Since such materials are the same, a stronger interface bond is formed in contrast to articles having interface bonds between different materials. Accordingly, the probability of a separation of parts of the article at an interface is reduced, thus improving the reliability of the optical articles over many conventional articles.

The optical articles have optical multi-aperture operation such that radiation from at least two wavelength bands may be simultaneously transmitted. The articles also may act as shields to EMI, RFI and other undesired forms of radiation. The articles have one or more electrically conductive layers with sheet resistances of a fraction of an ohm/square desired for many applications such as in windows and domes for terrestrial, nautical and aeronautical vessels.

DETAILED DESCRIPTION OF THE INVENTION

Figure 1:
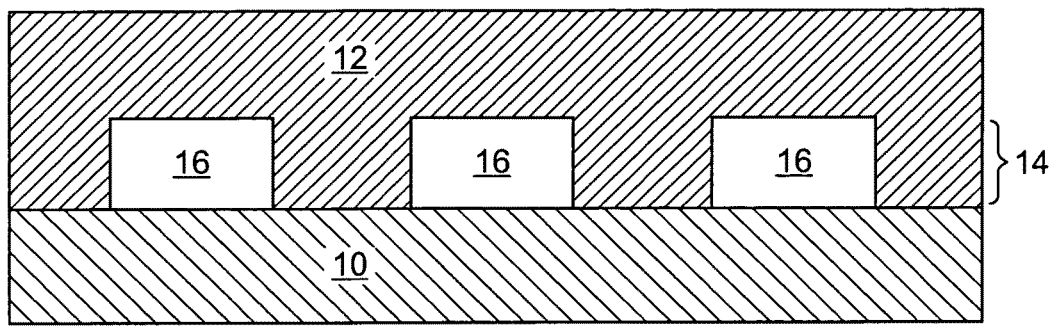
FIG. 1 is a cross-section of a portion of an optical article showing a patterned electronically conductive and selectively passivated grid.

As used throughout this specification, the following abbreviations have the following meaning, unless the context clearly indicates otherwise: ° C.=degrees Centigrade; gm=gram; nm=nanometer; CVD=chemical vapor deposition; PVD=physical vapor deposition process; CCVD=combustion chemical vapor deposition; CACCVD=controlled atmosphere combustion chemical vapor deposition; Å=angstrom=$10^{-10}$ meters; mm=millimeters; cm=centimeters; ohm-cm=electrical resistivity; µ=µm=microns=micrometers=$10^{-6}$ meters; UV=ultraviolet; IR=infrared; ohm/square=unit of sheet resistance; GHz=gigahertz; Hz=hertz=a periodic occurrence of once per second has a frequency of 1 Hz; Tor=torr=a unit of pressure=1 mm Hg at 0° C.; psi=pounds per square inch=0.06805 atmospheres; 1 atm=$1.01325 \times 10^6$ dynes/cm$^2$; A/dm$^2$=amperes/decimeter squared; and wt %=percent by weight; EMI=electromagnetic interference; RFI=radio frequency interference; aspect ratio=length/diameter of the article.

The terms "metal" means elemental metal, and "metal alloy" means mixtures of two or more elemental metals. "Multi-aperture operation" means transmission of radiation in at least two different wavelength bands simultaneously.

All percentages are by weight unless otherwise noted. All numerical ranges are inclusive and combinable in any order, except where it is logical that such numerical ranges are constrained to add up to 100%.

An article including one or more electrically conductive and selectively passivated patterns, each pattern is joined to and is between layers of material having a capability of multiple wavelength band radiation transmission. The article has optical multi-aperture operation. The electrically conductive and selectively passivated pattern include one or more metal or metal alloy layers. Optionally, a discrete bonding layer may be applied to join each electrically conductive and selectively passivated pattern to the materials having a capability of multiple wavelength band radiation transmission.

Bonding layers are included when the other components of electrically conducting material do not form an adequate bond with the materials which encase the electrically conducting and passivating materials. The bonding layer provides reinforced adhesion between the electrically conductive material and the material on which it is deposited.

The electrically conducting layers of the optical articles are selectively passivated to protect the conductive layers from the corrosive and reductive conditions under which the encasing material is applied. The electrically conductive layers may be composed of a metal, which is itself tolerant of the harsh conditions. Such metals are intrinsically passive (inert) and do not need to be encapsulated with an additional passivation coat. However, many metals are corroded or reduced under the harsh conditions used to apply the materials which encase the patterns. Such metals are selectively passivated by encapsulating them with one or more layers of an inert material.

The articles may transmit radiation in two or more wavelength bands such as in the gamma rays, X-rays, UV, visible, IR, and mm to one meter in range. Such multi-aperture articles may be employed as windows, domes and lenses to help guide or navigate terrestrial, nautical and aeronautical vessels by transmission of radiation at desired wavelength bands to an object or termination point for the vessel. Such articles also may protect electronic devices on such vessels by shielding undesired EMI, RFI or other forms of undesired radiation, which may interfere with the performance of the electronic devices and the navigation of the vessels.

Bonding layers, metal and metal alloy layers as well as passivation layers are selectively deposited to form a pattern. Generally, such patterns are a grid where the metal or metal alloy layers are in electrical communication with each other. A bus bar may be joined to the pattern to form electrical communication between the pattern of the optical article and another electronic component.

Any suitable electrically conductive metal or metal alloy may be employed provided that it has an electrical resistivity ranging from 50 micro-ohm-cm or less, or such as 50 micro-ohm-cm to 0.5 micro-ohm-cm, or such as from 45 micro-ohm-cm to 1 micro-ohm-cm, or such as from 20 micro-ohm-cm to 5 micro-ohm-cm. Measurements for electrical resistivity are made at 25° C.

Suitable metals include, but are not limited to, noble metals such as gold, silver, platinum, palladium, and their alloys. Non-noble metals also may be employed. Examples of suitable non-noble metals include copper, cobalt, chromium, tantalum, beryllium, nickel, molybdenum, tungsten, rhodium, iridium, ruthenium, nickel, titanium, tin, and alloys thereof. Such metals are deposited to a thickness such that the sheet resistivity of the metal and metal alloy layers range from 10 ohms/square or less, or such as 1 ohm/square to 10 ohms/square, or such as from 0.005 ohms/square to 0.5 ohms/square, or such as from 0.05 ohms/square to 0.25 ohms/square.

Metals and metal alloys may be selectively deposited as one or more layers by any suitable method known in the art. Examples of suitable methods for depositing metal and metal alloy layers include electrolytic plating, electroless plating, immersion plating, physical vapor deposition including ionized physical vapor deposition (I-PVD), ionized metal plasma deposition (IMP), CCVD and CACCVD. Metals such as molybdenum, titanium, tantalum and tungsten are deposited by physical vapor deposition. The deposition methods for metals and metal alloys are known in the art and many of the various methods described in the literature may be employed.

Metal and metal alloy plating baths vary in composition, thus the chemical composition of the plating bath as well as the plating conditions used depend on which metal or metal alloy is to be plated. Examples of such metals include copper and its alloys, nickel and its alloys, gold and its alloys, silver and its alloys, platinum and palladium and their alloys.

Physical vapor deposition (PVD) methods also are well known in the literature and the deposition parameters may vary from one method to another. There are a number of different physical vapor deposition techniques, which are distinguished by the manner in which the source material is vaporized. Commonly used physical vapor deposition techniques for converting the solid material into a gaseous/vapor plasma are: (a) resistance or induction heating; (b) electron beam or ion bombardment; and (c) electric arc or cathodic arc vapor deposition.

In resistance and induction heating techniques, the solid material is brought to its melting point by an external heat source or by passing high electric current levels through the solid material. The source material, or a portion thereof, first melts to a molten liquid state, and then vaporizes to a gaseous state to form the plasma.

In electron beam and ion bombardment techniques, a molten pool of material is created by bombarding the solid material with a high-energy beam of electrons or ions. The solid material is referred to as a "target", toward which the electrons or ions impart sufficient kinetic energy to the target material causing atoms, ions, molecules, ionized molecules and agglomerates of molecules to leave the target source material in the core of a plasma.

In electric arc physical vapor deposition and electric arc is struck and maintained between the solid material, which is electrically biased to serve as a cathode, and an anode that is spaced apart from the cathode. An arc-initiating trigger element is positioned proximate to the cathode and is positively biased with respect to the cathode. The trigger element is momentarily allowed to engage the surface of the cathode material, establishing a current flow path through the trigger and cathode. As the trigger element is removed from engagement with the cathode, an electrical arc is struck, which arc is thereafter maintained between the cathode and the anode of the chamber. The electric arc carries high electric current levels ranging from 30 to several hundred amperes and provides energy for vaporizing the solid material. The arc terminus is visible on the surface of the cathode where the arc touches the cathode, and is referred to as the cathode spot. One or more of such cathode spots may exist on the cathode surface at one time, depending upon the current present in the arc. The cathode spot randomly moves across the surface of the solid material, instantaneously vaporizing the solid material into plasma. The plasma contains atoms, molecules, ions, and agglomerates of molecules, and both ion charged and neutral particles. Examples of physical vapor deposition methods are disclosed in U.S. Pat. No. 6,764,940, U.S. Pat. No. 6,723,213, and U.S. Pat. No. 6,010,600, the disclosures of which are hereby incorporated in their entireties herein by reference.

The CCVD process permits the formation of thin film uniform layers in an open atmosphere without any furnace, vacuum, or reaction chamber. Deposition temperatures for CCVD deposition range from 300° C. to 3000° C. Deposition pressures range from 10 torr to as high as 10,000 ton. When an oxygen free environment is desired for thin film formation, CACCVD may be employed to deposit materials. CACCVD employs non-combustion energy sources such as hot gases, heated tubes, radiant energy, microwave and energized photons. Such methods are known in the art and disclosed in the literature.

The width (thickness) of the metal and metal alloy layers may range from 0.5 microns to 25 microns, or such as from 1 micron to 10 microns. The height (thickness) may range from 50 Å to 50,000 Å, or such as from 500 Å to 40,000 Å, or such as from 1000 Å to 30,000 Å, or such as from 5000 Å to 20,000 Å. The metal and metal alloy layers may contain one type of metal or metal alloy, or multiple layers of two or more metals or metal alloys.

Materials used to enclose each electrically conductive and passivated pattern of an article are any suitable material having a capability of multiple wavelength band radiation transmission. Generally, such materials include ceramics, sulfides, phosphides, metal oxides, silicon, germanium, and CVD-diamond. Specific examples of such materials include zinc sulfide, water-clear zinc sulfide, zinc selenide, germanium sulfide, sapphire ($Al_2O_3$), gallium arsenide, mercury cadmium telluride, gallium phosphide, aluminum oxynitride, yttrium oxide, and magnesium oxide. For example, water-clear zinc sulfide transmits radiation in the partial UV, full visible, partial IR and partial mm range; CVD-diamond transmits radiation in most wavelength bands except from 3 μm to 5 μm range; and zinc selenide transmits radiation in the visible, IR and mm ranges. Such materials may be shaped in forms such as domes, windows or other suitable shapes. Typically, ceramic materials such as zinc sulfide, water-clear zinc sulfide, and zinc selenide are used to enclose the patterns.

A first layer of material for encasing the patterns is formed as a base and it is deposited on a substrate by any suitable method know in the art. Exemplary methods include CVD and PVD. Many CVD and PVD methods are known in the art and may be readily found in the literature. Deposition conditions as well as reactants vary depending on which material is to be deposited. After the base is formed it may be machined, lapped and polished using conventional methods. Such materials may be machined, lapped and polished to have a scratch/dig specification of 120/80 or better such as 80/50. The smaller the scratch/dig specification is the better the polish.

CVD takes place in a reactor chamber having deposition substrates or mandrels for the deposition of reactants. The mandrels are shaped such that the deposit forms a desired shape such as a dome or a window. For example female mandrels (concave) may have an aspect ratio, defined as the depth divided by the inside diameter at its base, of less than 0.5, or such as from 0.01 to 0.1, and the male mandrels (convex) may have an aspect ratio of greater than or equal to 0.5 or such as from 1.25 to 3. The mandrels may be any suitable material such that the final product may be readily removed. An example of a suitable material is graphite. A release coating may cover the mandrel to assist in removing the end product. The reaction chamber consists of a water-cooled cylindrical stainless steel chamber, which may be heated to temperatures equal to and exceeding 1500° C. such as from 1550° C. to 2000° C. The reactor furnace may be heated using graphite heating elements. A graphite retort is mounted at the bottom of the furnace to contain one or more reactants. The retort may be heated to temperatures of 500° C. or more to generate reactant vapor pressures having desired vapor pressure. Such vapor pressures may be from 1 torr to 15 torr. Reactant vapors from the retort are carried to the deposition area using an inert gas such as argon. Such inert gases may have partial pressures of 10 torr to 30 torr. Other reactants are introduced into the chamber through a central injector. The other reactants are carried through the central injector by means of an inert gas. Reactant temperatures range from 500° C. to 2000° C. The reaction between reactants takes place in the chamber and the products of the reaction deposit on the mandrel. Examples of such methods and their apparatus are disclosed in U.S. Pat. No. 6,472,057, U.S. Pat. No. 6,464,912, U.S. Pat. No. 6,221,482, U.S. Pat. No. 6,083,561, U.S. Pat. No. 6,042,758, U.S. Pat. No. 5,686,195, U.S. Pat. No. 5,476,549, and U.S. Pat. No. 5,183,689 the entire disclosures of which are hereby incorporated in their entireties herein by reference.

Optionally, one or more bonding layers may be deposited on the base to secure the metal and metal alloy layers to the base Such bonding layer materials include, but are not limited to, metals such as chromium, titanium, tantalum, nickel, or combinations thereof, or compounds such as titanium nitride, titanium dioxide, silicon or combinations thereof. Bonding layers may range in width (thickness) of from 0.5 microns to 25 microns, or such as from 1 micron to 10 microns. The height (thickness) of the bonding layers may range from 50 Å to 1000 Å, or such as from 100 Å to 500 Å, or such as from 200 Å to 400 Å.

The bonding layers may be deposited by any suitable method known in the art. Methods for depositing the bonding layers include, but are not limited to, CVD, PVD, CCVD, CACCVD, electrolytic deposition and electroless deposition. Typically, the bonding layers are deposited by CVD and PVD, more typically by PVD.

One or more passivation layers may be selectively deposited on the one or more metal and metal alloy layers. Such passivation layers encapsulate the one or more metal or metal alloy layers, including the bonding layers, to protect them from harsh conditions during deposition encasing material. Such harsh conditions may cause corrosion of the metal and metal alloy layers and compromise their electrical conductivity and electrical resistivity, thus adversely affecting the performance of the article. The passivation layers also prevent or at least reduce interdiffusion and chemical reactions between the metals and the encasing materials. Additionally, the passivation layers prevent or reduce whiskering (also known as dendrites) on metals which are prone to forming them.

Any suitable material, which passivates the metals or metal alloys may be employed. Examples of such materials include oxides such as metal oxides, and oxides of silicon, metals such as platinum, palladium, electrolytic gold, rhodium, ruthenium, tantalum, and their alloys. Specific examples of oxides include beryllium oxide, aluminum oxide, silicon dioxide, titanium dioxide, thallium dioxide, yttrium dioxide and zirconium dioxide. Typically, the oxides used are titanium dioxide, silicon oxide and aluminum oxide. Typically, the metals used are palladium, platinum and electrolytic gold. The passivation layers may be alternating layers of two or more of the passivation materials.

Metals such as palladium, platinum, electrolytic gold, rhodium, ruthenium, and tantalum are inert to the harsh conditions used to deposit the encasing materials. In other words, the electrical conductivity of such metals is not compromised as with many other metals used to form the conductive pattern. Also, there is no observable interdiffusion between these metals and the encasing material. Accordingly, such metals are inherently passivated.

The passivation layers may be deposited by any suitable method. Examples of such methods include, but are not limited to, electrolytic deposition, CVD, PVD, CCVD, CAC-CVD. Examples of PVD methods suitable for depositing the passivation layers are by sputtering and e-beam evaporation. Width (thickness) of the passivation layers ranges from 0.5 microns to 25 microns, or such as from 1 micron to 10 microns. The height (thickness) ranges from 50 Å to 40,000

Å, or such as from 500 Å to 30,000 Å, or such as from 1000 Å to 20,000 Å, or such as from 5000 Å to 10,000 Å.

Typically, the passivation layers are deposited electrolytically. Any suitable electrolytic bath and process may be used to deposit the passivation materials provided that the passivation layers encapsulate the metal, metal alloy layers and any bonding layers to protect the integrity of their electrical conductivity and to ensure pattern survival from the harsh conditions when the encasing material is deposited and to prevent any undesired interdiffusion between adjacent materials. Electrolytic deposition of the passivation layers is the most suitable method for encapsulating the electrically conductive patterns to protect their integrity and ensure the survival of the patterns in the harsh gaseous environment of the deposition process. The electrolytic baths may be made based on the literature, or they may be commercially obtained. Examples of suitable commercially available gold baths are AURALL™ 364-A STRIKE and AUROFAB™ BP (Rohm and Haas Electronic Materials, 455 Forest Street, Marlborough, Mass., U.S.A.); and examples of suitable commercially available palladium baths are PALLADURE™ 150 and PALLADURE™ 500 (Rohm and Haas Electronic Materials, 455 Forest Street, Marlborough, Mass., U.S.A.).

The electrolytic baths are dilute metal plating baths containing metal ions in concentrations from 0.5 gm/L to 50 gm/L, or such as from 1 gm/L to 40 gm/L, or such as from 5 gm/L to 30 gm/L. For example, platinum ion concentrations may range from 5 gm/L to 40 gm/L, or such as from 10 gm/L to 20 gm/L; palladium ion concentrations may range from 1 gm/L to 20 gm/L, or such as from 5 gm/L to 15 gm/L; and gold ions may range from 0.5 gm/L to 15 gm/L, or such as from 2 gm/L to 10 gm/L. Accordingly, sufficient amounts of metal salts are added to the baths to provide metal within the ranges described above.

Any suitable metal salt which may be used to deposit the metal may be used. Examples of such salts include palladium salts such as palladium sulfate and palladium tetramine chloride; platinum salts such as chloroplatinic acid, and dinitrodiamine platinum; and gold salts such as alkali gold thiosulfide compounds such as trisodium gold thiosulfide, tripotassium gold thiosulfide, alkali gold sulfite compounds such as sodium gold sulfite and potassium gold sulfite, ammonium gold sulfite, gold halides such as gold chloride, alkali gold cyanide compounds, such as sodium gold cyanide and potassium gold cyanide, and ammonium gold cyanide. Typically the metal salts are water soluble.

In addition to the metal salts, the electrolytic baths may also include various optional components for bath maintenance. Such optional components include, but are not limited to, surfactants, buffers, suppressors, chelating agents, antioxidants, brighteners, stabilizers, biocides, solvents, and mixtures thereof. Such optional components may be included in conventional amounts. Typically, the baths are aqueous based, and have pH ranges of from less than 1 to 14, or such as from 2 to 10, or such as from 4 to 8.

Any suitable conventional electroplating apparatus may be used to deposit the passivation layers on the pattern. The electrically conductive pattern functions as a cathode, and any suitable conventional soluble or insoluble electrode may be used as the anode. A conventional hydrogen electrode may be used as the standard reference electrode. Both the cathode and anode are placed in the bath and each is connected to a conventional rectifier to form a complete electrical circuit. Plating times vary depending on the thickness of the passivation layers desired. Typically, plating times range from 2 seconds to 180 seconds, or such as 10 seconds to 120 seconds, or such as from 30 seconds to 60 seconds.

A sufficient current is applied during deposition of the passivation layers such that the entire pattern, including all the metal and metal alloy layers and bonding layers, are encapsulated. Accordingly, the bonding layers may be of a material which are sufficiently electrically conductive to sustain a current. Such bonding materials include, but are not limited to, chromium, titanium, tantalum, and nickel. Typically chromium and titanium are used as the bonding layer, more typically chromium.

While not being bound by theory, the electrolytic deposition process encapsulates the entire electrically conductive pattern because sufficient current is believed to pass through all of the metal and metal alloy layers, thus depositing passivation material on the entire electrically conductive pattern. Suitable current densities for encapsulating the electrically conductive pattern include 0.05 A/dm$^2$ to 100 A/dm$^2$, or such as from 0.5 A/dm$^2$ to 50 A/dm$^2$, or such as from 1 A/dm$^2$ to 30 A/dm$^2$, or such as from 5 A/dm$^2$ to 15 A/dm$^2$.

Optionally, prior to depositing the passivation layers on the pattern, the pattern may be conditioned. Conditioning is performed by immersing the pattern in a conventional electrolytic cleaner and passing an electric current through the pattern for 5 to 60 seconds at a current density of 0.25 A/dm$^2$ to 1 A/dm$^2$. Such electrolytic cleaners are low foaming, alkaline cleaners. They are commercially available. An example of a commercially available cleaner is RONACLEAN™ GP-300 LF (Rohm and Haas Electronic Materials, 455 Forest Street, Marlborough, Mass., U.S.A.).

Another cleaning method includes immersing the pattern in a solution of inorganic acid such as a 10% to 30% solution of sulfuric acid. Immersion may range from 5 seconds to 15 seconds. After immersion the pattern may be rinsed with water to remove excess acid.

The optical articles have multi-aperture operation with at least 30% transmission of radiation of at least one wavelength band, or such as from 40% to 95% transmission of radiation of at least one wavelength band, or such as from 50% to 90% transmission of at least one wavelength band, or such as from 60% to 80% transmission of at least one wavelength band. Exemplary wavelength bands include UV such as from 10 nm to 450 nm, visible range of 400 nm to 800 nm, IR range of from 0.8 μm to 100 μm, and GHz range of 0.1 mm to 1 meter.

Typically, transmission is 60% to 90% in the 3-5 micron range, and 45% to 90% in the 1.06 micron range. Typically transmission is 55% to 90% in the 3 to 10 micron range, and 45% to 90% in the 0.9 to 3 micron range.

Figure 4:
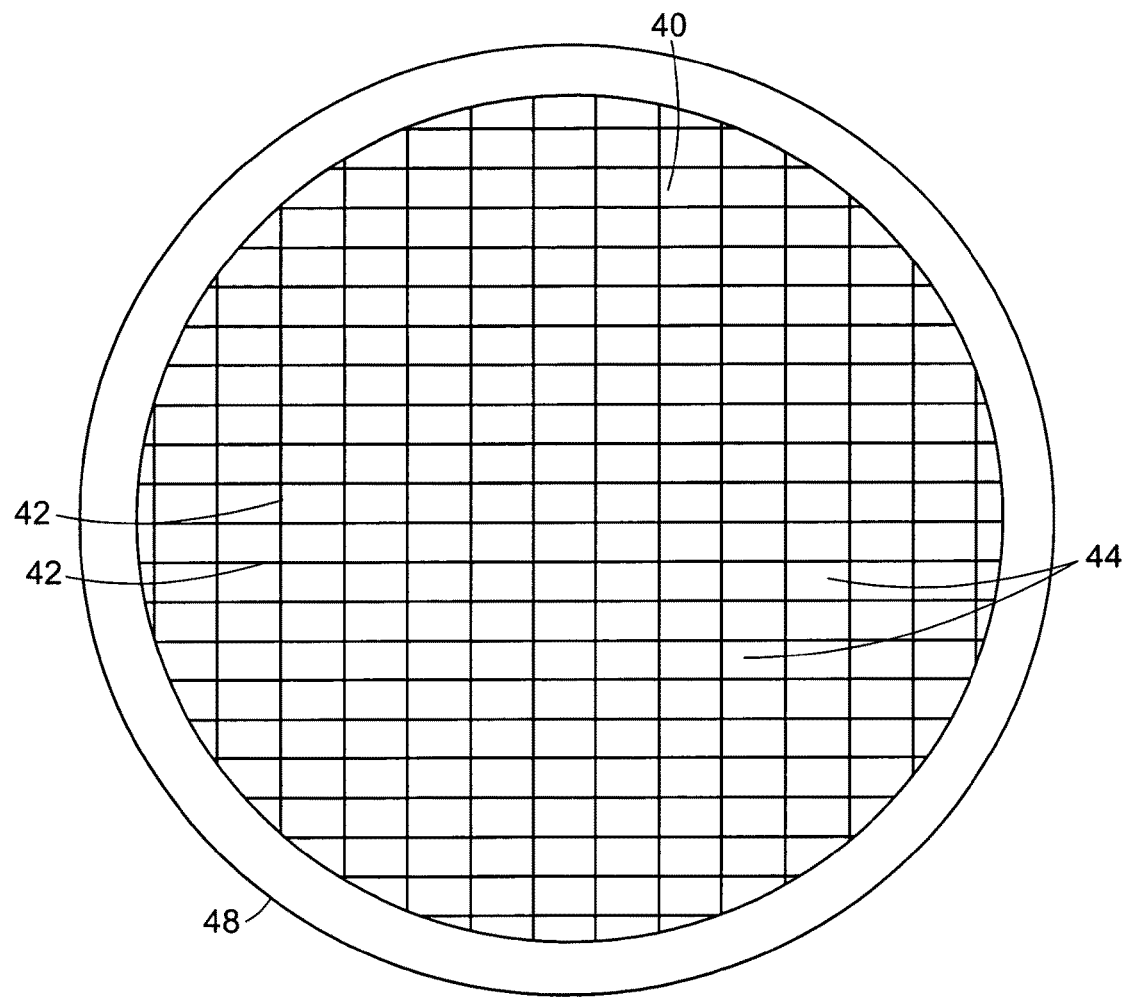
FIG. 4 is a top view showing a grid pattern of an electronically conductive and selectively passivated article in electrical communication with a bus bar.

FIG. 1 illustrates a cross-section of one embodiment of the optical article. A base 10 and top coat 12, which are composed of the same material, and may be composed of materials such as zinc sulfide, water-clear zinc sulfide or zinc selenide. The electrically conductive pattern 14 has a selectively deposited metal layer 16. The metal layers form an interconnecting grid pattern as illustrated in FIG. 4. The metal of the metal layers 16 can withstand the harsh conditions of CVD deposition of the top coat 12 and adheres well to the base, thus the metal is itself inherently passivated. Such metals include palladium, platinum, electrolytic gold, and tantalum.

Figure 2:
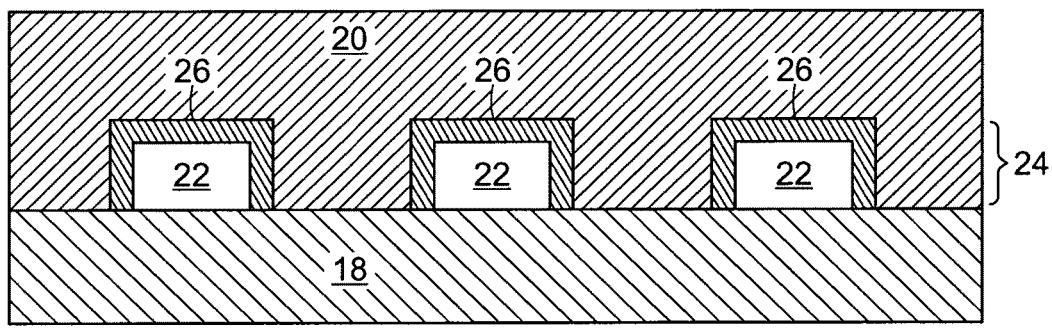
FIG. 2 is a cross-section of a portion of an optical article showing a patterned electronically conductive and selectively passivated grid where the passivation layer is discrete from the metal layer.

FIG. 2 illustrates a cross-section of another embodiment of the optical article. A base 18 and top coat 20, both of which are composed of the same material such as germanium, germanium sulfide, water-clear zinc sulfide, zinc sulfide or zinc selenide, enclose selectively deposited metal layers 22 in pattern 24. Each metal layer 22 has a selectively deposited passivation layer 26 encapsulating it. Examples of such metals, which typically are encapsulated with a passivating layer, are PVD gold, copper and their alloys, and molybdenum. Examples of materials used for passivation include aluminum oxide, titanium dioxide, silicon dioxide, platinum, palladium and electrolytic gold. The metal layers coated with the passivation material form a grid pattern as illustrated in FIG. 4.

Figure 3:
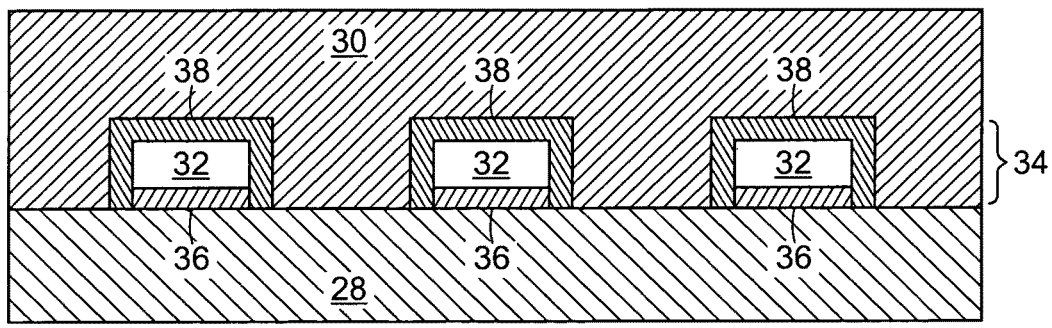
FIG. 3 is a cross-section of a portion of an optical article showing a patterned electronically conductive and selectively passivated grid where the passivation layer is discrete from the metal layer and the metal layer is joined to the base material by a discrete bonding layer.

FIG. 3 illustrates a cross-section of an additional embodiment of the optical article. A base 28 and top coat 30, both of which are composed of the same material such as sapphire, CVD diamond, silicon, water-clear zinc sulfide, zinc sulfide or zinc selenide, enclose selectively deposited metal layers 32 in pattern 34. Metal layers 32 are bonded to base 28 by bonding layers 36. The bonding layers may be a metal different from the metal of metal layers 32 or may be an element such as silicon or an oxide such as titanium dioxide. Selectively deposited passivation layers 38 coat metal layers 32 and bonding layers 36. The selectively deposited layers of pattern 34 form a rectangular grid pattern as illustrated in FIG. 4.

FIG. 4 illustrates a top view of an optical article without the top coat. Grid pattern 40 includes the electrically conductive and selectively passivated layers of metal in pattern lines 42. The lines 42 are in electrical communication with each other. Each line 42 is separated from an adjacent line by spaces 44, which is composed of the base material. A bus bar 48 is electrically connected to the grid 40, and the bus bar 48 connects the grid 40 to an electrical power source (not shown). The bus bar may be composed of any suitable metal such as titanium, tantalum, gold, silver, copper or any other conductive metal.

The electrically conductive and selectively passivated pattern may be in the form of a grid having the shape of rectangles, rhombuses, lines, rows, ellipses, and triangles. The electrically conductive layers themselves may be in the form of rectangular cubes, lines, pyramidal, rhomboid, cones and frustoconical. An optical article may have one or more electrically conductive patterns. In such articles each conductive pattern is separated from an adjacent pattern by one or more layers of the encasing materials. Such layers range from 0.5 to 50 mm thick, or such as 1 mm to 24 mm thick, or such as from 5 mm to 15 mm thick.

The patterns may be formed by any suitable method known in the art such as by photolithography processes. For example, after the encasing material is deposited a pattern may be formed employing photosensitive materials. Such photosensitive materials include photoresist or photosensitive inks. Both positive-acting and negative-acting photoresists may be employed to form the desired pattern. The photoresist or photosensitive ink may be applied to the encasing material by any suitable method known in the art such as spray coating, roller coating, lamination or by ink-jet application. When a photoresist is employed, a dry film or liquid photoresist such as a waterborne photoresist may be used. A phototool or mask having a desired pattern may be applied to the photosensitive material. When the photosensitive material is applied by ink-jet application, the phototool may be excluded because the ink-jet applies the photosensitive material in pattern form. The photosensitive material is then exposed to actinic radiation, and portions of the photosensitive material are developed with a suitable developer. The remaining photosensitive material forms a pattern of spaces and channels where the layers of the electrical conducting material are to be deposited.

The patterns also may be formed by laser write. The dome or article to be patterned has a positive photoresist applied to its surface and then is mounted on a computer controlled gimbal mount. A laser beam is then directed to the surface and the encasing material to be patterned is moved in such a way as to produce the desired pattern by exposing the photoresist to the laser beam. The encasing material is then removed and the photoresist is developed to form the patterned channels (channels are created where photoresist was irradiated with laser beam).

The patterns may have various distances between the electrically conducting lines. For example the distances may range from 0.5 µm to 2000 µm, or such as from 10 µm to 1000 µm, or such as from 100 µm to 500 µm, or such as from 50 µm to 100 µm.

The materials for the electrically conducting layers, are then deposited in the channels or spaces. The materials, which are deposited by physical vapor deposition, cover the top portions of the photosensitive materials and the channels or spaces of the pattern. Portions of the walls remain uncoated because they are not within the line of sight of deposition. These portions of the walls of the photosensitive materials remain uncoated and a stripper may be used to solubilize or disperse the photosensitive material to remove it. The photosensitive material with any materials deposited on it is removed by lift-off. The electrically conductive layers remain. If both the top portions and walls of the photosensitive material are coated such that a stripper can not make contact with the photosensitive material, laser energy may be applied to remove any coating on the photosensitive material to expose it such that the stripper may contact it. One or more bus bars may be inserted to provide electrical contact between the electrically conductive layers and an outside power source. When one or more passivation layers are desired, the passivation layers may be deposited on the exposed portions of the metal or metal alloy, prior to removing any remaining photosensitive material. The remaining photosensitive material is then stripped with a suitable stripper.

Portions of the metal or metal alloy, which are now exposed, are selectively coated with one or more passivation layers. Alternatively, all of the passivation layers may be selectively deposited on the metal or metal alloy after stripping the photosensitive material. A phototool or mask having suitable dimensions is aligned in relation to the pattern such that one or more layers of the passivation material selectively encapsulates any remaining exposed metal or metal alloy and bonding material.

Phototools or masks used for deposition of the protective or passivation layers have dimensions which depend upon the dimensions of the electrically conductive pattern. Such masks are stencils having apertures which circumvalate the electrically conductive layers. The apertures are sufficiently wide to permit the passage of protective material over the metal and metal alloy layers and along the sides of the layers during application of the passivation material. Ratios of the line width of a mask to the line width of the pattern may range from 1.01 to 3, or such as from 1.2 to 1.5. Examples of suitable masks are those which have line width values ranging from 0.27 µm to 190 µm, or such as from 1.2 µm to 120 µm.

In another embodiment the metal and metal alloy layers may be oxidized such that a film of metal oxide coats the metal and metal alloy layers. Any suitable oxidizing agent and method may be employed to form the metal oxide film. Examples of suitable oxidizing agents include hydrogen peroxide ($H_2O_2$), molecular oxygen ($O_2$), ozone ($O_3$) or triatomic oxygen, potassium permanganate ($KMnO_4$), potassium dichromate ($K_2Cr_2O_7$), potassium chlorate ($KClO_3$), nitric acid ($HNO_3$), sulfuric acid ($H_2SO_4$) or mixtures thereof. Metal and metal alloy layers are exposed to the oxidizing agents for a sufficient amount of time to form a film of oxidized metal over the metal and metal alloy surfaces.

The oxidizing agents may be applied by any suitable method known in the art such as by immersing the base with the electrically conductive pattern in a solution of the oxidizing agents, spraying the oxidizing agents onto the metal, exposing the metal to oxidizing agents in gaseous form such in a gas chamber.

Liquid solutions of oxidizing agents are employed as aqueous solutions. For example hydrogen peroxide is employed as a 20 wt % to 60 wt % solution; potassium permanganate may be employed as a 10 wt % to 50 wt % solution; potassium chlorate may be employed as a 15 wt % to 50 wt % solution; nitric acid may be employed as a 5 wt % to 30 wt % solution; and sulfuric acid may be employed as a 10 wt % to 40 wt % solution. When immersion is employed, solution temperature may range from 18° C. to 80° C., or such as from 22° C. to 40° C. The patterned layers are left in the immersion bath until the metal or metal alloy forms an oxidized film over the surfaces. After oxidation the electrically conductive pattern is rinsed with water to remove any residue of oxidizing agent.

Oxidizing agents may be sprayed on the metal using a spray gun or any other comparable apparatus. After spraying the oxidizing agent is left on the metal until all surfaces of the metal and metal alloy are oxidized. The metal layers are then rinsed with water to remove any residue of oxidizing agent. Spraying temperatures of oxidizing solutions are the same as for immersing.

When the oxidizing agent is applied as a gas such as for molecular oxygen, or ozone, the electrically conductive pattern is placed in a suitable chamber for the generation of the respective gases. Suitable concentrations of gaseous molecular oxygen may range from 20% by volume to 90% by volume. A source of oxygen may be air or commercially available oxygen sources. Temperatures for oxidizing with oxygen may range from 30° C. to 220° C., or such as from 50° C. to 150° C.

When ozone is used as the oxidizing agent, it is continuously made because it has a short existence. Ozone generators form ozone at concentration rates of from 1 gm/hour to 50 gm/hour, or such as from 5 gm/hour to 30 gm/hour, or such as from 10 gm/hour to 20 gm/hour. Any suitable commercially available ozone generator and a short wavelength UV exposure unit of 200 nm to 500 nm, or such as from 230 nm to 350 nm or such as from 245 nm to 260 nm may be employed. Ozone generators may produce ozone from industrial oxygen (94% to 99%) using the corona discharge principle. An electrical field is increased until electrical coronas are created. Oxygen molecules split by collision with electrons to form atomic oxygen. The oxygen atoms of the atomic oxygen react with molecular oxygen or other oxygen atoms to form ozone or oxygen molecules. An example of a commercially available ozone generator is a CD-10/AD unit supplied by RGF $O_3$ Systems of West Palm Beach, Fla.

In an alternative ozone method the ozone may be bubbled or injected into an aqueous environment which contains the electrically conductive pattern. U.V. radiation is applied at wavelengths of from 200 nm to 500 nm. The ozone absorbs the energy from the U.V. radiation to form oxygen ($O_2$) and an excited oxygen atom (O*). The excited oxygen combines with water to form both hydrogen peroxide and hydroxyl radicals (OH). Hydrogen peroxide subsequently forms hydroxyl radicals. The hydroxyl radicals oxidize the metal. The reaction scheme is as follows:

$$O_3 + UV \rightarrow O_2 + O^*$$

$$O^* + H_2O \rightarrow 2.OH$$

$$O^* + H_2O \rightarrow H_2O_2$$

$$H_2O_2 + UV \rightarrow 2.OH$$

Examples of metal oxides formed by the foregoing methods include gold trioxide, silver oxide, copper oxide, beryllium oxide, cobaltous oxide, cobaltic oxide, cobaltocobaltic oxide, titanium dioxide, molybdenum dioxide, molybdenum sesquioxide, molybdenum trioxide, iridium dioxide, rhodium monoxide, rhodium dioxide, rhodium sesquioxide, ruthenium dioxide, tungsten dioxide, tungsten trioxide and tungsten pentaoxide.

Combinations of the foregoing methods may be employed to selectively passivate the metals and metal alloys. For example, chemical vapor deposition may be used to passivate the top portions of the metal or metal alloy layers. The sides of the layers can be passivated by oxidation.

Selective passivation means that only the electrically conductive layers along with any bonding layers are encapsulated with the passivation material. Intervening spaces between the electrically conductive pattern do not contain passivation material. This reduces or eliminates the undesired index of refraction of radiation from the optical article. Accordingly, radiation transmission from the article is improved over many conventional articles.

After the passivation layers are deposited on the electrically conductive patterns, a layer of encasing material is deposited to enclose the pattern. The second layer is the same material as the initial material on which the pattern was formed, and may be deposited by any suitable method. Because both layers are composed of the same materials, the interface of the two layers forms a strong bond since both layers are of the same material. The deposition process is the same for depositing the second layer as the first.

After deposition, the second layer may be machined, lapped and polished using conventional methods. It is machined, lapped and polished to a scratch/dig specification of 120/80 or better such as 80/50. Optionally, an anti-reflection coating may be placed on the article. Such anti-reflection coatings may lower the refractive index of the article. For example, a zinc sulfide coating may have a refractive index of 2.2. Applying an anti-reflective coating on it may reduce the refractive index to 1.3 and improve the performance of the article. Such anti-reflective coatings are dielectric materials such as fluorides, metal oxides and alumina.

Optical articles may be employed to protect electronic devices used in terrestrial, nautical or aeronautical vessels. Such articles may be domes, windows, bandpass filters, and gratings for heating and de-icing. Such articles are multi-aperture and may transmit radiation at wavelength bands from the gamma rays, UV, visible, IR, mm ranges to one meter. Such articles also may shield EMI, RIF and other forms of undesired radiation.

Example 1

Multi-Aperture Zinc Sulfide Articles with Titanium-Tungsten (Ti—W) Conductive Layer Zinc sulfide was produced by the reaction of elemental zinc with hydrogen sulfide at a temperature of 675° C. and a furnace pressure of 35 torr. The furnace was heated resistively using graphite heating elements. A graphite retort was mounted at the bottom of the furnace containing zinc. The retort was heated to a temperature of 700° C. to generate zinc vapor pressures of 5 torr. Zinc vapors were carried to the deposition area using argon as a carrier gas. Hydrogen sulfide at 3 torr was mixed with the argon at 28 torr and the mixture was introduced into the deposition area through a central injector. The hydrogen sulfide and zinc flow rates in the reactor provided a molar ratio of hydrogen sulfide to zinc sulfide during the reaction of 0.6 to 1. Zinc sulfide was deposited on the four inside walls of an open rectangular box. The average deposition rate of zinc sulfide was 1 micron/minute. The inside walls were shaped into flat mandrels. A release coating was applied on the mandrels to seal the graphite pores, thus preventing zinc sulfide from adhering to the mandrels.

After the zinc sulfide was deposited on the mandrels to form flat or curved panels, the panels were removed from the mandrels and machined to remove any graphite contaminant and to smooth the surface. The zinc sulfide substrates were then wrapped in platinum foil and placed in a graphite crucible which was then loaded in a HIP chamber to form water clear zinc sulfide. Heating of the crucible was initiated and an isostatic pressure greater than 14,000 psi was established in the HIP chamber by the time the temperature reached 500° C. The temperature rose to 990° C. and the pressure was maintained at 15,000 psi until the process was completed. The pressure was reduced to atmospheric after the temperature was reduced to less than 500° C. After removal from the crucible the water clear zinc sulfide substrates were machined to the required dimensions, and lapped and polished using conventional methods to polishing specifications of scratch/dig=80/50.

The polished water clear zinc sulfide substrates were coated with a negative acting photoresist and exposed to radiation through a patterned mask to form line widths of 10 microns and spacings between the lines of 300 microns and a continuous coated area around the periphery of the substrate about 1 cm wide to act as a buss bar to make electrical contact to the grid. The unexposed photoresist was developed away to form the pattern lines on the zinc sulfide substrate. Titanium metal having a thickness of 300 Å was deposited in the channel using an e-beam deposition method. A 20,000 Å layer of titanium-tungsten (Ti—W) having a composition of 10% titanium and 90% tungsten was deposited on the titanium by sputtering. The photoresist remaining on the water clear zinc sulfide articles were stripped using acetone. Any photoresist with deposited metal is lifted off of the articles.

The water clear zinc sulfide substrate bases with the electrical conducting pattern were then placed in a CVD chamber. The bus bar area was protected with a graphite fixture to prevent deposition of zinc sulfide in this area. Hydrogen sulfide gas and argon gas were allowed to flow for 20 hours. The hydrogen sulfide activated the zinc sulfide surface of the patterned substrate to promote adhesion of a zinc sulfide top coat on a zinc sulfide base. A zinc sulfide top layer was produced by the reaction of elemental zinc with hydrogen sulfide at a temperature of 675° C. and a furnace pressure of 35 torr. The partial pressures were as follows: zinc=4 torr, hydrogen sulfide=3 torr and argon=28 torr. The average deposition rate for zinc sulfide was 1 micron/minute, and the molar ratio of hydrogen sulfide to zinc during deposition was 0.6 to 1.

After deposition of the zinc sulfide top layer, the articles were machined, lapped and polished to a scratch/dig ratio of 80/50 and a thickness of less than 1 mm. No anti-reflection coating was placed on the articles. The articles with the buried electrical conducting patterns had 65% transmission in the 3 to 10 microns wavelength range and 50% transmission in the 0.9 to 3 microns range. The sheet resistance of the conducting patterns were 0.5 ohms/square.

Example 2

Multi-Aperture Zinc Sulfide Articles with Tantalum (Ta) Conductive Layer

Water clear zinc sulfide substrates are prepared according to the method of Example 1 including the hipping process. A photoresist pattern is applied according to Example 1. Tantalum metal is deposited in the channels by sputtering using a conventional method such that the tantalum layer has a thickness of 20,000 Å. The photoresist remaining on the water clear zinc sulfide substrates is stripped using acetone. The photoresist with any deposited materials is lifted off the water clear zinc sulfide bases.

A zinc sulfide top coat is deposited on each zinc sulfide substrate base with the tantalum conductive grid using a CVD method as described in Example 1. After deposition of the zinc sulfide top layer, the articles are machined, lapped and polished to a scratch/dig ratio of 80/50. No anti-reflection coating is applied to any of the articles. The zinc sulfide articles are measured for transmission and are expected to measure greater than 60% transmission in the 3 to 10 micron wavelength ranges and 45% transmission in the 0.9 to 3 micron range. The sheet resistance of the conducting patterns is expected to be less than 1 ohm/square.

Example 3

Multi-Aperture Zinc Sulfide Articles with Molybdenum (Mo) Conductive Layer

Water clear zinc sulfide substrates are prepared according to the method of Example 1. A photoresist pattern is applied according to Example 1.

Titanium metal having a thickness of 300 Å is deposited in the channels using a conventional sputtering deposition method. After the deposition of the titanium layer, a layer of titanium dioxide having a thickness of 500 Å is deposited on the titanium layer by a conventional e-beam physical vapor deposition method. Molybdenum having a thickness of 10,000 Å is deposited on the titanium dioxide layer by a conventional sputtering deposition technique. The photoresist remaining on the water clear zinc sulfide is stripped using acetone. The photoresist with any deposited materials is lifted off the water clear zinc sulfide bases. In order to passivate and protect the exposed Ti/TiO$_2$/Mo metal during the subsequent overcoat deposition of zinc sulfide, the articles with the exposed Ti/TiO$_2$/Mo metallic pattern are heated to 250° C. for at least one hour in an atmosphere of oxygen to oxidize the exposed Ti/TiO$_2$/Mo on all sides.

A zinc sulfide top coat is deposited on each zinc sulfide substrate base with the conductive grid using a CVD method as described in Example 1. After deposition of the zinc sulfide top layer, the article is machined, lapped and polished to a scratch/dig ratio of 80/50. No anti-reflection coating is applied to the articles. The zinc sulfide articles are expected to have a transmission greater than 60% transmission in the 3 to 10 micron wavelength ranges and greater than 45% transmission at the 0.9 to 3 micron range. The sheet resistance of the conducting patterns is expected to be less than 1 ohm/square.

Example 4

Multi-Aperture Zinc Sulfide Articles with Gold Conducting Layer Passivated with Platinum A 50 mm diameter×6 mm thick water-clear zinc sulfide article was produced in a chemical vapor deposition furnace. Initially the furnace was flushed with an inert gas and the pressure in the furnace was brought to 35 torr. A graphite mandrel was brought to an initial temperature of 700° C. and zinc in the retort of the furnace was heated to a temperature in excess of 575° C. The flow of argon and hydrogen sulfide through the injector of the furnace was initiated at flow rates of 113 slpm (standard liters per minute) for argon and 9 slpm for hydrogen sulfide. The zinc vapor was gradually brought to its target flow rate of 12 slpm by increasing the zinc retort control temperature to 650° C. over the first hour of deposition. Thereafter, the retort control temperature increased until it reached 660° C.

After deposition was complete the substrate was removed from the mandrel and machined to remove any graphite contaminants and to smooth the surface. The substrate was then wrapped in platinum foil and placed in a graphite crucible which was then loaded in a HIP chamber. Heating of the crucible was initiated and an isostatic pressure greater than 14,000 psi was established in the HIP chamber by the time the temperature reached 500° C. The temperature rose to 990° C. and the pressure was maintained at 15,000 psi until the process was completed. The crucible was then cooled to room temperature at a rate controlled not to exceed 30° C. per hour. The pressure was reduced to atmospheric after the temperature was reduced to less than 500° C. After removal from the crucible, the zinc sulfide substrate was lapped and polished.

A square pattern was then formed on the zinc sulfide using photolithographic and physical vapor deposition processes. A negative-acting photoresist was roller coated on the zinc sulfide substrate to a thickness of 1 micron. A phototool having the desired pattern was applied to the negative-acting photoresist and exposed to UV radiation with a conventional UV lamp for a sufficient time to cure the exposed portions of the photoresist. After the photoresist was cured it was developed in a 1 wt % solution of sodium carbonate monohydrate to remove the unexposed portions of the photoresist.

The imaged water clear zinc sulfide substrate was then placed in a conventional e-beam chamber to deposit a chromium bonding layer on the water clear zinc sulfide. Chromium deposition proceeded until a layer (height) of 200 Å of chromium was deposited on the water clear zinc sulfide portions not covered by cured photoresist. The chamber was then cleaned and the parameters were set for e-beam deposition of gold on the chromium bonding layer. Gold was deposited on the chromium bonding layer until a layer (height) of gold of 5000 Å was formed.

After the layers of chromium and gold were deposited, the remaining photoresist was stripped from the water clear zinc sulfide substrate. The photoresist was stripped with acetone. After stripping, the water clear zinc sulfide substrate with the chromium and gold layers was prepped for passivation.

The substrate was first electrolytically cleaned in a bath of RONACLEAN™ GP-300 LF for 10 seconds at a current density of 1 A/dm$^2$ and at a bath temperature of 50° C. The substrate was then removed and immersed in a 25 wt % solution of sulfuric acid for 10 seconds at room temperature. After the acid cleaning the substrate was removed and rinsed with tap water. The substrate was then placed in a platinum metal electroplating bath.

The platinum bath included 20 gm/L of chloroplatinic acid, which provided a platinum ion concentration of 15 gm/L. The bath also included 300 gm/L of hydrogen chloride. The pH of the bath was less than 1.

The substrate to be plated with the platinum functioned as the cathode and the anode was an insoluble platinum dioxide electrode. The current density was 15 A/dm$^2$. Plating time was 5 seconds, which was a sufficient time to encapsulate the chromium and gold layers with 5000 Å (height) of platinum. The width of the metal plated lines of the grid pattern were 15 microns and the spacing between the lines was 520 microns.

The selectively passivated substrate was then activated with hydrogen sulfide prior to depositing a top coat of zinc sulfide. Activation promoted adhesion of the zinc sulfide substrate to the zinc sulfide top coat. The electrically conductive and selectively passivated zinc sulfide substrate was placed in a chemical vapor deposition chamber. The chamber was pumped down to vacuum and heated to 300° C. A flow of argon into the chamber was begun while the temperature in the chamber was raised to 600° C. A flow of hydrogen sulfide (along with argon) into the chamber was begun and continued for 6 hours.

After 6 hours, the chamber temperature was raised to 690° C. and a flow of zinc metal vapor (along with argon) into the chamber was begun while the flow of hydrogen sulfide continued. The chamber pressure was at 35 torr. The partial pressure of zinc was 4 torr and the partial pressure of hydrogen sulfide was 3 torr. The partial pressure of argon was 28 torr. A zinc sulfide top coat was deposited on the electrically conductive and selectively passivated water clear zinc sulfide substrate.

The zinc sulfide optical article was machined, lapped and polished to a scratch/dig ratio of 85/50 and a total thickness of 7 mm.

The transmissions for the optical article were measured to be 57% transmission at the 3-5 micron range and 45% transmission at the 1.06 micron range. The measurements were made using a conventional spectrophotometer. No anti-reflection coating was placed on the article.

The sheet resistance of the conducting pattern was measured to be 0.7 ohms/square. The sheet resistance was done with a conventional four point probe.

Figure 5:
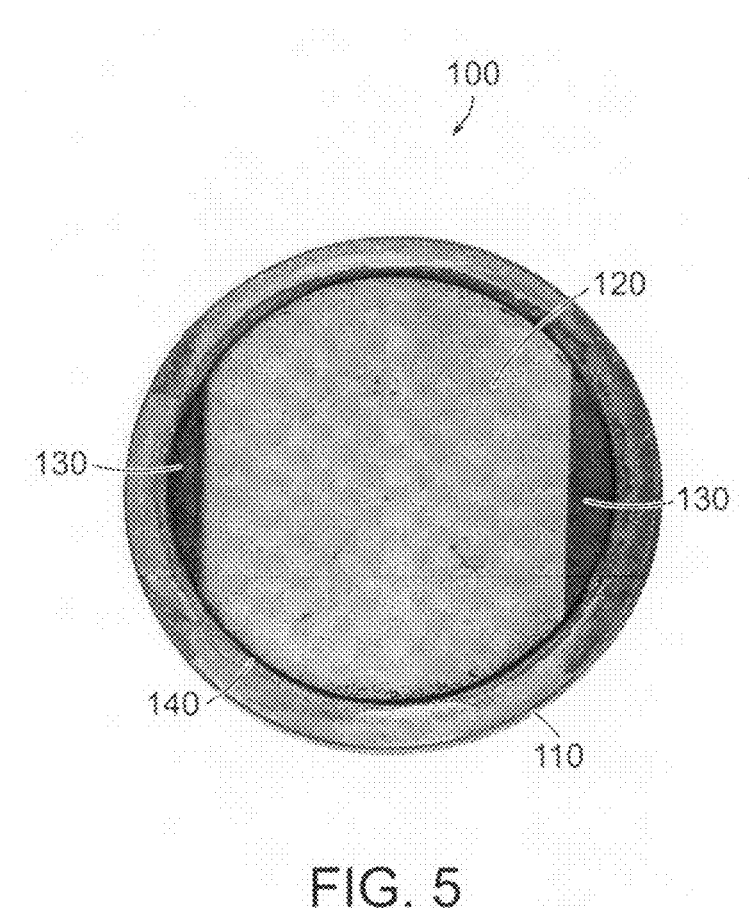
FIG. 5 is a top view of an optical article with a water clear zinc sulfide base and over coated with zinc sulfide.

FIG. 5 is a top photograph of the article made according to the method described above. The zinc sulfide optical article 100 includes a spherical water clear zinc sulfide base 110 with a middle section 120 which includes the electrically conductive and selectively passivated layers composed of chromium bonding layers coated with a gold layer, both metals are encapsulated with platinum metal (individual layers are not shown). Two bus bars 130 are provided such that the article may be placed in electrical communication with a power source (not shown). The article is top coated with zinc sulfide 140.

Example 5

Multi-Aperture Zinc Sulfide Article with Buried Platinum Passivation Layer

An electrically conductive and selectively passivated zinc sulfide optical article is prepared according to the methods described in Example 4, except that a gold layer 200 Å (height) is deposited on the chromium bonding layer. After the chromium and gold layers are deposited by the physical vapor deposition method described in Example 4, the water clear zinc sulfide substrate with the chromium and gold layers is electroplated with a platinum.

The chromium and gold plated water clear zinc sulfide substrate is placed in a platinum metal electroplating bath where the concentration of platinum ions is 20 gm/L. The source of platinum ions is chloroplatinic acid. Hydrogen chloride also is included in the bath in an amount of 300 gm/L. The pH of the bath is less than 1.

The chromium and gold plated water clear zinc sulfide substrate functions as the cathode and the anode is an insoluble platinum dioxide electrode. The current density is 15 A/dm$^2$ and it is applied for 10 seconds to deposit an encapsulation layer around the chromium and gold deposit of 9000 Å in height and 10 microns wide. Since platinum is an inherently passivating metal, no additional passivation materials are deposited.

The electrically conductive and selectively passivated water clear zinc sulfide substrate is then cleaned and further processed as described in Example 4 to form a zinc sulfide top coat. The article is machined, lapped and polished using conventional methods. No anti-reflection coating is added to the article.

The transmission of the article in the 3-5 micron range is expected to be greater than 50%, and the transmission of the article at 1.06 microns is expected to be greater than 40%. The sheet resistance of the conducting patterns is expected to be less than 0.7 ohms/square.

Example 6

Multi-Aperture Zinc Sulfide Article with Buried Palladium Conducting Layer

An electrically conductive zinc sulfide article is prepared with a chromium bonding layer and a gold layer as described in Example 4, except that palladium is deposited over the chromium and gold layers instead of platinum.

After the chromium and gold layers are deposited on the water clear zinc sulfide substrate by physical vapor deposition, the substrate is electrolytically cleaned for 10 seconds in a bath of low foam alkaline cleaner. The current density is 1 A/dm². After the substrate is electrolytically cleaned, it is placed in a 25% sulfuric acid bath for 10 seconds for additional cleaning. The cleaned substrate is removed from the acid bath and rinsed with deionized water. It is then placed in an aqueous palladium metal electroplating bath. The bath includes palladium salts in sufficient amounts to provide palladium ions in a concentration of 7 gm/L. The pH of the bath is 7.5.

The water clear zinc sulfide substrate functions as the cathode and a platinum dioxide insoluble electrode functions as the anode. A hydrogen electrode is used as the standard reference electrode. The current density during palladium deposition is 5 A/dm², and the bath temperature during palladium deposition is 60° C. Palladium deposition proceeds for 10 seconds after which the chromium bonding layer is encapsulated in 10000 Å (height) of palladium and a width of 10 microns. Since the palladium metal is an inherently passivating metal, no further metal is deposited on the pattern.

The electrically conductive and selectively passivated water clear zinc sulfide substrate is then placed in a chemical vapor deposition furnace for deposition of a zinc sulfide top coat. The zinc retort in the furnace is initially heated to a temperature above 570° C. The absolute pressure in the furnace is adjusted to 35 torr. Argon is introduced as a carrier gas at a flow rate of 113 slpm. Hydrogen sulfide is provided at a flow rate of 9 slpm. Zinc vapor flow rate is ramped up to a target flow rate of 12 slpm by increasing the average zinc temperature in the retort to 650° C. over the first 60 minutes of the run. Thereafter, the retort control temperature is increased until it reaches 660° C. The zinc and hydrogen sulfide flow rates provide a hydrogen/zinc molar ratio of 0.75, which ratio is maintained throughout the run. Deposition continues for a total of 1.5 hours. The resulting article is then machined, lapped and polished.

The transmissions of the zinc sulfide optical article are measured in the 3-5 microns range and are expected to be greater than 50%. In the 1.06 microns range the transmission is expected to be greater than 40%. The article does not have an anti-reflection coating. The sheet resistivity is expected to be less than 0.7 ohms/square.

Example 7

Multi-Aperture Zinc Sulfide Article with Gold Conductive Layer Passivated with Palladium A bonding layer of chromium metal was selectively deposited on a zinc sulfide substrate as described in Example 4 to form a rectangular grid pattern. A gold conductive layer was then deposited on the chromium bonding layer by physical vapor deposition as described in Example 4 except that the gold layer was 7000 Å thick (height).

After deposition of the gold layer, the substrate was electrolytically cleaned in a solution of RONACLEAN™ GP-300 LF for 10 seconds then cleaned with a 25 wt % solution of sulfuric acid for another 10 seconds. The cleaned substrate was then rinsed with deionized water for 5 seconds. After cleaning the metal layers, the substrate was then passivated with palladium metal.

The electrically conductive water clear zinc sulfide substrate was placed in a palladium metal bath (PALLADURE™ 150) at a temperature of 40° C. The anode was a palladium dioxide insoluble electrode and the reference electrode was a standard hydrogen electrode. The current density during deposition of the palladium metal was 15 A/dm². Palladium deposition was done over 5 seconds to encapsulate the gold and chromium layers.

The electrically conductive and selectively passivated water clear zinc sulfide substrate was then placed in a chemical vapor deposition furnace for deposition of the zinc sulfide top coat as described in Example 4. The deposition continued for 1 hour. The article was removed from the furnace, machined, lapped and polished to a scratch dig ratio of 85/50.

The transmission at 3-5 microns was determined to be 40%, and the transmission at 1.06 microns was determined to be 25%. The sheet resistance of the conducting patterns was measured to be 0.1 ohms/square.

Example 8

Multi-Aperture Zinc Sulfide Articles with Gold Conductive Layer Passivated with Gold A chromium bonding layer was deposited on a water clear zinc sulfide substrate as described in Example 4. A gold layer was then deposited on the chromium layer by physical vapor deposition as described in Example 4 to form a gold layer of 5000 Å (height). After the layer of gold was deposited on the chromium layer, the substrate was then electrically cleaned in a bath of RONACLEAN™ GP-300 LF for 10 seconds, and also cleaned for 10 seconds in a bath of 25 wt % sulfuric acid. The substrate was then rinsed with tap water for 5 seconds.

The cleaned substrate was then selectively passivated with electrolytic gold. The substrate was placed in an electrolytic gold bath (AURALL™ 364A STRIKE) and electrolytic gold was deposited over the chromium and physical vapor deposited gold for a period of 60 seconds to encapsulate them. The pH of the bath was 3.8 and the bath temperature was 43° C. The current density was 0.2 A/dm² during gold deposition. The electrolytic gold formed a gold layer 4500 Å thick (height).

The water clear zinc sulfide with the electrically conductive and selectively passivated pattern was then top coated with zinc sulfide according the method described in Example 4.

The final article had a transmission of 55% in the 3-5 microns range and a transmission of 30% in 1.06 microns range. The sheet resistance of the conducting pattern was measured to be 0.6 ohms/square.

Example 9

Multi-Aperture Water Clear Zinc Sulfide with Buried Conducting Layers

Electrically conductive and selectively passivated zinc sulfide articles are prepared according to the methods described in Examples 4-8 except that each article is treated with an additional hipping process to convert the zinc sulfide top coat into water-clear zinc sulfide. This improves the article's visible and IR transmission.

The electrically conductive and selectively passivated zinc sulfide articles from Examples 4-8 are wrapped in a platinum foil and subjected to a temperature of 990° C. and a pressure of 15000 psi for 25 hours in a furnace. After the hipping treatment is completed, the transmission of each article and the sheet resistance of each article is measured. The transmission at 3-5 microns is expected to be greater than 65% and the transmission at 1.06 microns is expected to be greater than 60%. The sheet resistance of the conducting patterns is expected to be less than 0.7 ohms/square.

Example 10

Multi-Aperture Zinc Sulfide Domes with Buried Conductive Layers

Zinc sulfide substrates are prepared according to the methods of Examples 4-8 except that the graphite mandrels are domed shaped (convex) such that the zinc sulfide substrates form domes with inside diameters ranging from 5 cm to 20 cm.

A rectangular grid pattern composed of layers of chromium and gold having line widths of 15 microns to 20 microns and spaces between each chromium line of from 200 microns to 500 microns are made on each dome shaped zinc sulfide substrate. The grid patterns are formed by placing a titanium curved mask having suitable dimensions to form the grid patterns on the domes. The domes with the masks are then placed in a conventional physical vapor deposition chamber as described in the previous Examples for depositing the chromium bonding layers and the gold layers.

After the chromium bonding layers and gold layers are deposited on the zinc sulfide domes, the titanium masks are removed by lift off. The domes are then plated with palladium or platinum using palladium or platinum electroplating baths as described in the proceeding Examples. Plating conditions for each type of metal bath are described in the previous Examples. The palladium layers are 15,000 Å thick (height), and the platinum layers are 20,000 Å thick (height)

Each dome is then top coated with a zinc sulfide layer by one of the methods described in Example 4 to form dome shaped articles with buried electrically conductive and selectively passivated grid patterns.

The transmission of the articles is expected to be greater than 50% at 3-5 microns and greater than 40% at 1.06 microns. The sheet resistivity of the articles is expected to be less than 0.7 ohms/square.

The process described above is repeated except that the pattern is formed using laser write instead of patterned titanium masks. A laser apparatus is programmed to image a pattern on each zinc sulfide dome. A conventional helium-cadmium laser was used.

Example 11

Multi-Aperture Water-Clear Zinc Sulfide Domes with Buried Conductive Layers

To further improve the transmission performance of the domes made in Example 10, the domes are re-made according to the procedures described except that after the domes are completed, they are further treated.

Each zinc sulfide dome with a buried electrically conductive and selectively passivated pattern grid is wrapped in platinum foil and subjected to a temperature of 990° C. and a pressure of 15000 psi for 25 hours. This transforms the zinc sulfide domes into water-clear zinc sulfide. The electrically conductive patterns in each dome are expected to have a sheet resistivity of less than 0.7 ohms/square. The transmission at 3-5 microns is expected to be greater than 65%, and the transmission at 1.06 microns is expected to be greater than 60%.

Example 12

Multi-Aperture Water-Clear Zinc Sulfide Domes with Two Buried Conducting Layers

The water-clear zinc sulfide articles with the electrically conductive and selectively passivated grids as described in Example 11 are re-made. The articles are lapped and polished to a scratch/dig ratio of 80/50.

Electrically conductive metallic grids corresponding in composition and dimensions to those of the first grids are deposited on the concave side of each dome. Since the water-clear zinc sulfide provides a visible window to the first grid layer, alignment of the second grid layer with the first is readily accomplished. The second grid layer is of chromium and gold layers as in Example 10 and formed by the same processes as the first grid layer. The second grid is then coated with a layer of zinc sulfide using the processes described in Example 4. The zinc sulfide layer for each article is then lapped and polished to a scratch/dig ratio of 80/50.

The transmission of the domes is expected to be greater than 65% in the 3-5 micron range and greater than 60% in the 1.06 micron range. The sheet resistance of each pattern is expected to be less than 0.7 ohm/square.

Examples 13-20

Encapsulation of Electrically Conductive Patterns

Eight zinc sulfide flats (Examples 13-20) having diameters of 50 mm and a thickness of 6 mm were prepared by chemical vapor deposition. The flats were formed on flat graphite mandrels. The conditions and reactants for depositing the zinc sulfide onto the mandrels was the same as described in Example 4 above.

Four of the zinc sulfide flats were further processed to form them into water-clear zinc sulfide (Examples 17-20). Each of the four flats was wrapped in platinum foil and subjected to a temperature of 990° C. and a pressure of 15000 psi for 20 hours.

A grid pattern was formed on each of the flats using the photolithographic process described in Example 4. After the grid pattern was formed the lines of each grid received a bonding layer of chromium 200 Å thick. The formation of the grid pattern and the chromium deposition were done on the flats by the same processes as described in Example 10. A layer of gold 5000 Å thick was then deposited on the chromium. The gold was deposited by the same physical vapor deposition process as disclosed in Example 10.

The flats of Examples 13-16 were rinsed in deionized water for 2 minutes at room temperature. The flats of Examples 17-20 were cleaned electrolytically in a bath of RONACLEAN™ GP-300 LF at 1 A/dm$^2$ for 10 seconds at a temperature of 50° C., then rinsed with deionized water for 2 minutes at room temperature. The flats were then immersed in a 25 wt % sulfuric acid solution for another 10 seconds at room temperature. The flats of Examples 17-20 were then removed from the acid solution and rinsed with deionized water for 2 minutes at room temperature.

The surface profile was then measured according to the method of profilometry using a Dektak™ V200-Si manufactured by Veeco. The line widths and line height of the chromium and gold metal layers on each flat and their values are in the table below.

The zinc sulfide flats with the chromium and gold layers (Examples 13-16) were then placed into a palladium metal electrolytic bath for depositing a passivation layer to encapsulate the chromium and gold layers. The bath included a water soluble palladium salt at a concentration sufficient to provide palladium ions at a concentration of 7 gm/L.

The flats functioned as a cathode and the anode was an insoluble platinum dioxide electrode. The current density was maintained at 0.1 A/dm$^2$, and the bath temperature was 40° C. The pH of the bath was 7.5. Plating was done over 2.5 minutes to provide palladium metal encapsulations as shown in the table. Each flat was rinsed in deionized water for 2 minutes at room temperature.

The water-clear zinc sulfide flats (Examples 17-20) were placed in a palladium electrolytic bath. The bath included water soluble palladium salts in sufficient amounts to provide a concentration of palladium ions at 25 gm/L. The pH of the bath was 7.3 and the temperature of the bath during plating was 50° C.

The flats functioned as a cathode and the anode was an insoluble platinum dioxide electrode. Current density during palladium deposition was 2 A/dm$^2$. Plating was done over 12 seconds to provide palladium encapsulations as shown in the table. Each flat was rinsed in deionized water for 2 minutes at room temperature.

The surface profile of each flat was then measured using profilometry. The widths and the heights of the plated grids are in the table below.

TABLE

| EXAMPLE | Line Width before Plating (microns) | Line height before Plating (Angstroms) | Line Width after Palladium Plating (microns) | Line Height after Palladium Plating (Angstroms) | Width Increase (microns) | Height Increase (Angstroms) |
|---|---|---|---|---|---|---|
| 13 | 19.3 | 7120 | 22.4 | 27900 | 3.1 | 20780 |
| 14 | 18.1 | 6910 | 22.5 | 24400 | 4.4 | 17490 |
| 15 | 17.7 | 7480 | 22.2 | 23100 | 4.5 | 15620 |
| 16 | 18.3 | 7660 | 27.2 | 24000 | 8.9 | 16340 |
| Average for Examples 13-16 | 18.4 | 7290 | 23.6 | 24850 | 5.2 | 17560 |
| 17 | 17.6 | 8220 | 24.8 | 26000 | 7.2 | 17780 |
| 18 | 17.7 | 8130 | 23.5 | 27800 | 5.8 | 19670 |
| 19 | 17.4 | 8210 | 22.4 | 25800 | 5.0 | 17590 |
| 20 | 18.1 | 8130 | 22.6 | 26400 | 4.5 | 18270 |
| Average for Examples 17-20 | 17.7 | 8220 | 23.3 | 26500 | 5.6 | 18280 |

In each Example the data showed that both the line width and the line height increased after deposition of the palladium layers. The average increase in the line width for Examples 13-16 was 5.2 microns, and the average increase in the line width for Examples 17-20 was 5.6 microns. The average line height increase for Examples 13-16 was 17560 Å, and the average line height increase for Examples 17-20 was 18280 Å. The increases in both the line width and the line height in each Example indicate that the entire chromium and gold metal layers were completely encapsulated within the palladium metal layers.

What is claimed is:

1. An article comprising an electrically conductive and selectively passivated grid pattern having a height of 50 Å to 40,000 Å, the electrically conductive and selectively passivated grid pattern comprises one or more metal layers, the one or more metal layers are joined to an activated base by one or more bonding layers and a top coat covers the electrically conductive and selectively passivated grid pattern, wherein the electrically conductive and selectively passivated grid pattern is passivated with a layer of platinum, palladium or electrolytic gold and the top coat is joined to the activated base at interfaces of the top coat with the activated base to encase the passivated grid pattern, the top coat and the activated base are of the same material, the activated base and top coat are composed of zinc sulfide, water-clear zinc sulfide or zinc selenide, and the article has multi-aperture operation of 55% to 90% radiation transmission in the 3 micron to 10 micron range, or 45% to 90% radiation transmission in the 0.9 micron to 3 micron range.

2. The article of claim 1, wherein the one or more bonding layers comprise chromium, titanium, tantalum or nickel.

3. The article of claim 1, wherein an electrical resistivity of the one or more metal layers is 50 micro-ohm-cm or less.

4. The article of claim 1, wherein a sheet resistance of each electrically conductive and selectively passivated pattern is 10 ohms/square or less.

5. The article of claim 1, wherein the one or more metal layers comprise gold, silver, platinum or palladium.

6. The article of claim 1, wherein a width of the passivation layer is from 0.5 microns to 25 microns.

* * * * *